(12) United States Patent
Kim et al.

(10) Patent No.: US 12,317,124 B2
(45) Date of Patent: May 27, 2025

(54) METHOD AND APPARATUS FOR MANAGING QUALITY OF SERVICE IN WIRELESS COMMUNICATION SYSTEM

(71) Applicant: Samsung Electronics Co., Ltd., Suwon-si (KR)

(72) Inventors: Dongyeon Kim, Suwon-si (KR); Jungshin Park, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 17/740,812

(22) Filed: May 10, 2022

(65) Prior Publication Data

US 2022/0361038 A1   Nov. 10, 2022

(30) Foreign Application Priority Data

May 10, 2021   (KR) ........................ 10-2021-0060338

(51) Int. Cl.
*H04W 28/02*    (2009.01)
*H04L 65/40*    (2022.01)
*H04W 28/08*    (2023.01)

(52) U.S. Cl.
CPC ......... *H04W 28/0268* (2013.01); *H04L 65/40* (2013.01); *H04W 28/0263* (2013.01); *H04W 28/0942* (2020.05)

(58) Field of Classification Search
CPC ............. H04W 24/10; H04W 28/0263; H04W 28/0268; H04W 28/08; H04W 28/0858;
(Continued)

(56) References Cited

U.S. PATENT DOCUMENTS 10,602,415 B2 *  3/2020  Bae ................. H04W 76/30
10,772,004 B2 *  9/2020  Wu .................. H04W 76/20
(Continued)

FOREIGN PATENT DOCUMENTS

KR   10-2021-0047386 A   4/2021

OTHER PUBLICATIONS

Lenovo et al., Open Issues on PMF measurements per QoS Flow, S2-2102307, SA WG2 Meeting #144E, Apr. 6, 2021.
(Continued)

*Primary Examiner* — Alpus Hsu
(74) *Attorney, Agent, or Firm* — Jefferson IP Law, LLP

(57) ABSTRACT

The disclosure relates to a $5^{th}$ Generation (5G) or $6^{th}$ Generation (6G) communication system for supporting a higher data transmission rate. A method performed by a session management function (SMF) entity in a wireless communication system is provided. The method includes transmitting, to a user plane function (UPF) entity, information indicating a list of quality of service (QoS) flows over which access performance measurements are to be performed, receiving, from the UPF entity, information indicating user datagram protocol (UDP) ports allocated for the QoS flows, and transmitting, to a user equipment (UE), information including the list of QoS flows and the UDP ports.

12 Claims, 10 Drawing Sheets

(58) Field of Classification Search
CPC ......... H04W 28/0867; H04W 28/0942; H04W 76/15; H04L 65/40
See application file for complete search history.

(56) References Cited

U.S. PATENT DOCUMENTS

| | | | | |
|---|---|---|---|---|
| 10,779,254 | B2* | 9/2020 | Lee | H04L 47/821 |
| 2019/0007500 | A1* | 1/2019 | Kim | H04L 67/141 |
| 2019/0007992 | A1* | 1/2019 | Kim | H04W 76/27 |
| 2019/0053105 | A1* | 2/2019 | Park | H04W 36/14 |
| 2019/0261211 | A1* | 8/2019 | Wu | H04W 76/20 |
| 2019/0387428 | A1* | 12/2019 | Ahmad | H04L 69/08 |
| 2019/0394833 | A1* | 12/2019 | Talebi Fard | H04W 68/005 |
| 2020/0015130 | A1* | 1/2020 | Wang | H04W 76/12 |
| 2020/0022031 | A1* | 1/2020 | Li | H04W 36/0044 |
| 2020/0092212 | A1* | 3/2020 | Yu | H04W 28/0268 |
| 2020/0221527 | A1* | 7/2020 | Bharatia | H04W 76/22 |
| 2020/0267784 | A1* | 8/2020 | Bharatia | H04L 65/80 |
| 2020/0280511 | A1* | 9/2020 | Gapin | H04L 67/141 |
| 2020/0383005 | A1* | 12/2020 | Wu | H04W 28/0268 |
| 2020/0389811 | A1* | 12/2020 | Guo | H04W 76/20 |
| 2021/0297904 | A1* | 9/2021 | Watfa | H04W 28/0268 |
| 2022/0182861 | A1* | 6/2022 | Youn | H04W 28/10 |

OTHER PUBLICATIONS

Lenovo et al., Send PMF messages to a target QoS flow, S2-2103303, SA WG2 Meeting #144E, Apr. 16, 2021, Elbonia.
ZTE, Packet Loss Rate Measurements per QoS flow, S2-2102901, SA WG2 Meeting #144E, Apr. 6, 2021.
Nokia et al., Corrections for MA PDU session handling, S2-1911299, SA WG2 Meeting #136, Nov. 8, 2019, Reno, Nevada, USA.
International Search Report dated Aug. 12, 2022, issued in International Application No. PCT/KR2022/006672.

* cited by examiner

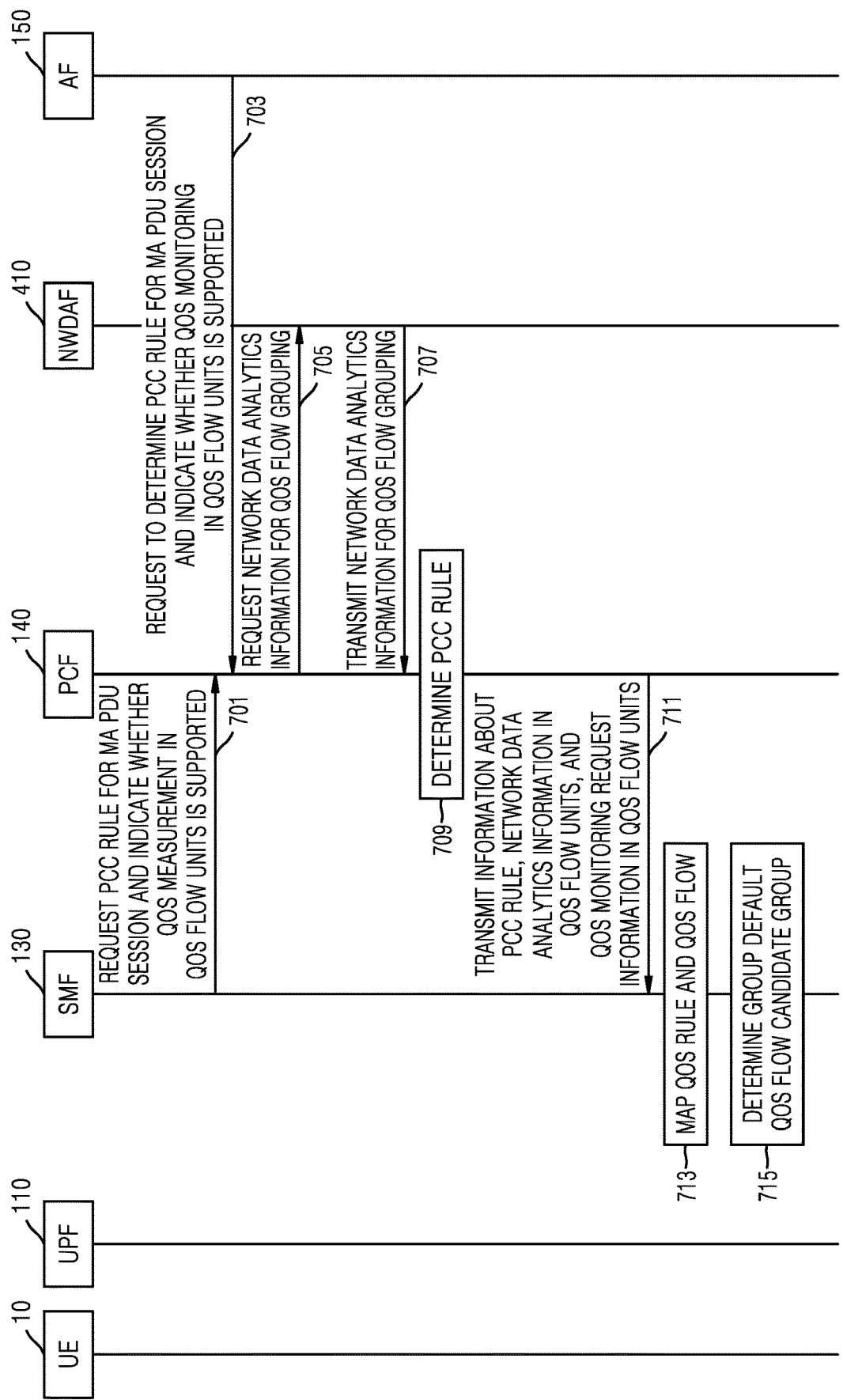

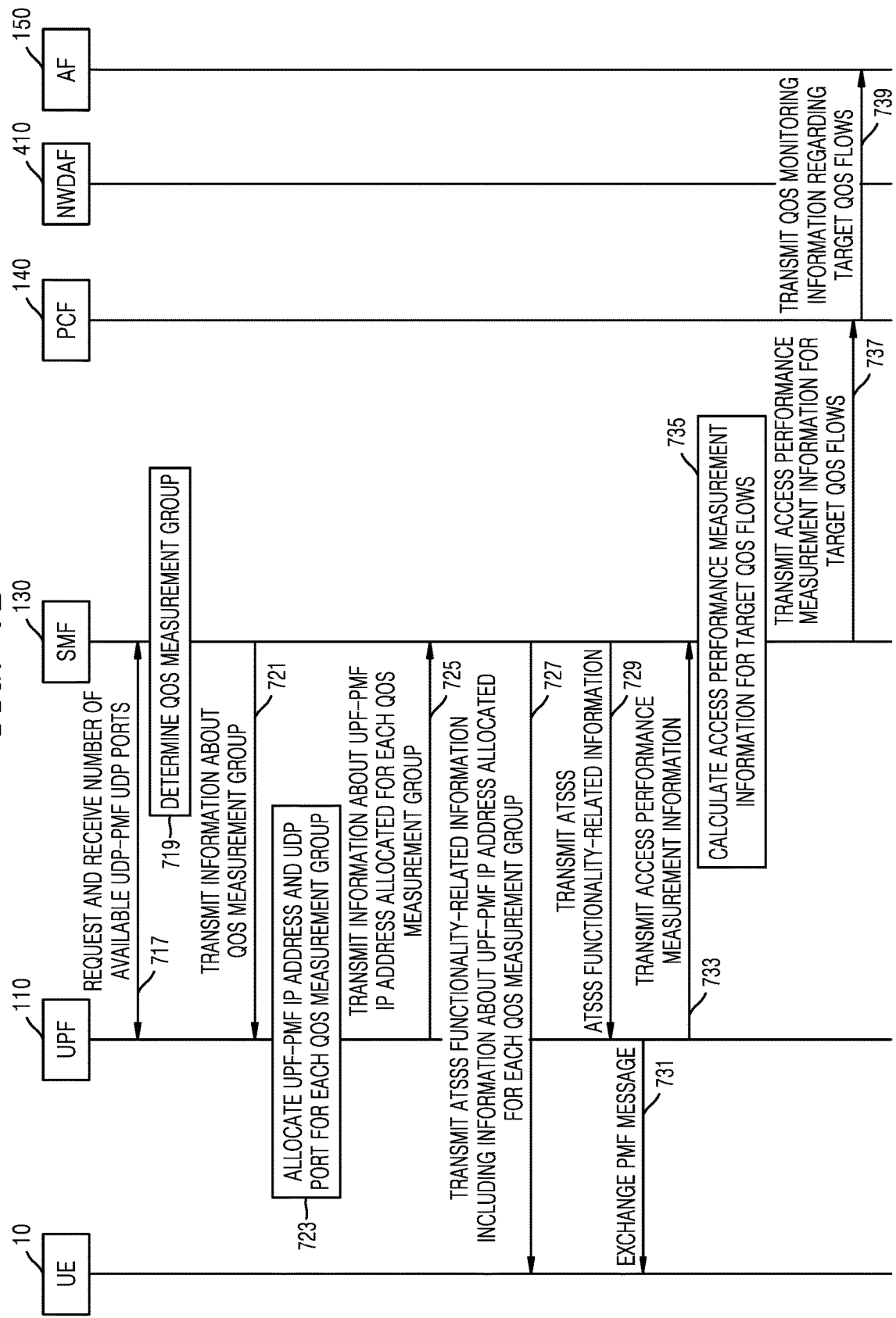

METHOD AND APPARATUS FOR MANAGING QUALITY OF SERVICE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0060338, filed on May 10, 2021, in the Korean Intellectual Property Office, the disclosure of which is incorporated by reference herein in its entirety.

BACKGROUND

1. Field

The disclosure relates to a method and an apparatus for managing quality of service in a wireless communication system or a mobile communication system. More particularly, the disclosure relates to a method and an apparatus for providing an access traffic steering, switching, splitting (ATSSS) functionality in a wireless communication system.

2. Description of the Related Art $5^{th}$ generation (5G) mobile communication technologies define broad frequency bands such that high transmission rates and new services are possible, and can be implemented not only in "Sub 6 giga hertz (GHz)" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) use equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide are a method and an apparatus for measuring a data traffic transmission performance in communication between a user equipment (UE) and a core network, in a wireless communication system.

Additional aspects will be set forth in part in the description which follows and, in part, will be apparent from the description, or may be learned by practice of the presented embodiments.

In accordance with an aspect of the disclosure, a method performed by a session management function (SMF) entity in a wireless communication system is provided. The method comprises transmitting, to a user plane function (UPF) entity, information indicating a list of quality of service (QoS) flows over which access performance measurements are to be performed, receiving, from the UPF entity, information indicating user datagram protocol (UDP) ports allocated for the QoS flows, and transmitting, to a user equipment (UE), information including the list of QoS flows and the UDP ports.

In accordance with another aspect of the disclosure, an SMF entity in a wireless communication system is provided. The SMF comprises a transceiver, and at least one processor coupled to the transceiver and configured to transmit, to a UPF entity via the transceiver, information indicating a list of QoS flows over which access performance measurements are to be performed, receive, from the UPF entity via the transceiver, information indicating UDP ports allocated for the QoS flows, and transmit, to a UE via the transceiver, information including the list of QoS flows and the UDP ports.

In accordance with another aspect of the disclosure, a method performed by a UPF entity in a wireless communication system is provided. The method comprises receiving, from a SMF entity, information indicating a list of QoS flows over which access performance measurements are to be performed, transmitting, to the SMF entity, information indicating UDP ports allocated for the QoS flows, and transmitting, to a UE, a performance measurement function (PMF) message, based on the QoS flows and the UDP ports.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A is a flow diagram of a session management method and a procedure related thereto according to an embodiment of the disclosure;

FIG. 7B is a flow diagram of a session management method and a procedure related thereto according to an embodiment of the disclosure;

The same reference numerals are used to represent the same elements throughout the drawings.

DETAILED DESCRIPTION

Figure 1:
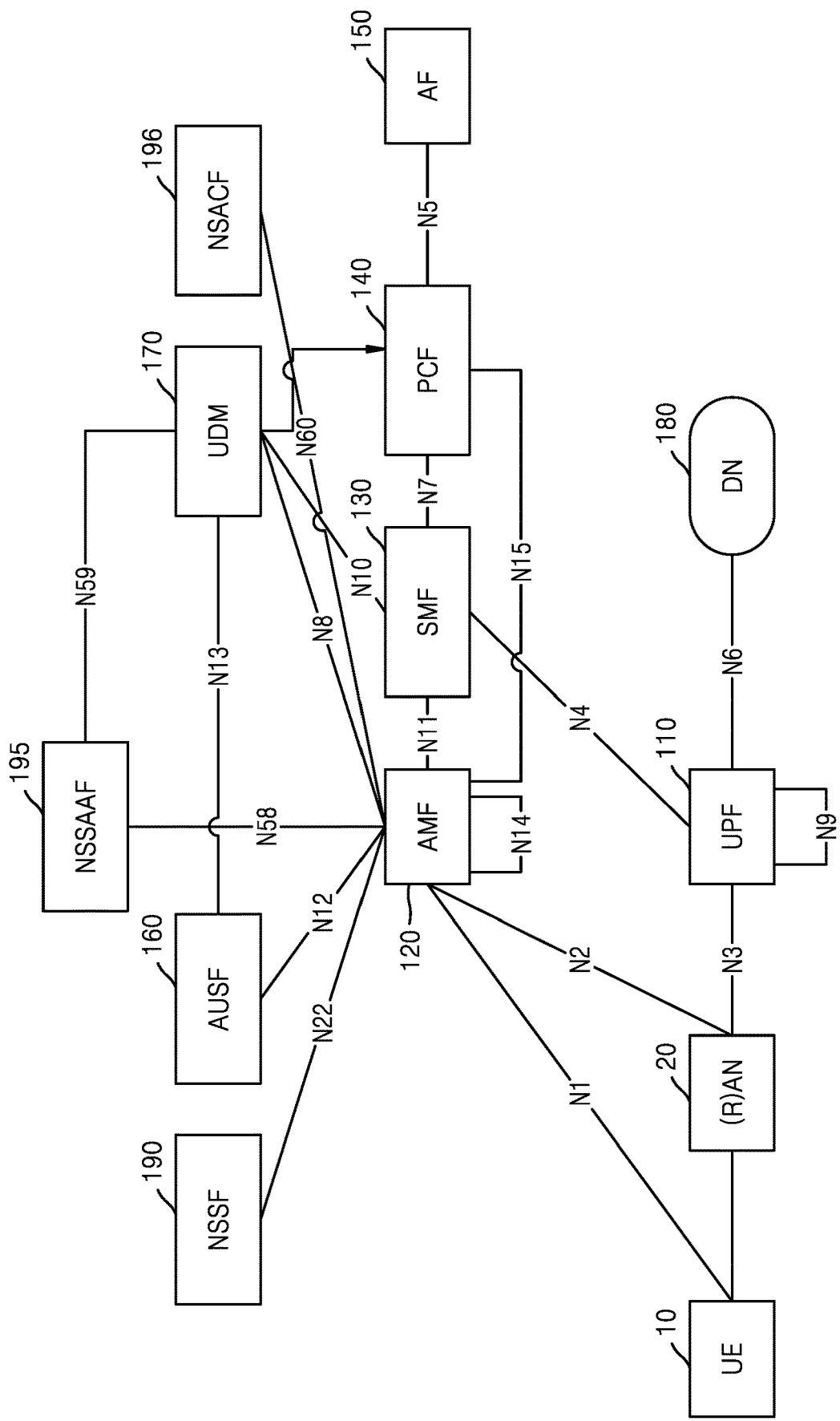
FIG. 1 is a diagram of a structure of a $5^{th}$ generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In embodiments of the disclosure, a controller may also be referred to as a processor.

In embodiments of the disclosure, a layer (or a layer apparatus) may also be referred to as an entity.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component, such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. In addition, in the embodiments of the disclosure, the "unit" may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

In addition, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the $3^{rd}$ generation partnership project long term evolution (3GPP LTE) standard. However, the disclosure is not limited by such terms and names, and may be equally applied to systems conforming to other standards. In embodiments of the disclosure, an evolved node B (eNB) will be used interchangeably with a next generation node B (gNB) for convenience of description. In other words, a base station described as an eNB may also indicate a gNB. In addition, the term 'terminal' may indicate not only mobile phones, narrow band-Internet of Things (NB-IoT) devices, and sensors, but also other wireless communication devices.

Hereinafter, a base station (BS) is an entity that allocates resources to a terminal, and may be at least one of a gNode B (gNB), an eNode B (eNB), a Node B (NB), a BS, a wireless access unit, a BS controller, or a node on a network. The disclosure is not limited to the above examples.

More particularly, the disclosure may be applied to 3GPP NR ($5^{th}$ generation (5G) mobile communication standard). In addition, the disclosure may be applied to intelligent services (e.g., smart homes, smart buildings, smart cities, smart cars or connected cars, health care, digital education, retail business, and security and safety related services) based on 5G communication technology and Internet of things (IoT) related technology.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, IEEE 802.16e, or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (e.g., an eNB), and the DL refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra-reliability low latency communication (hereinafter, URLLC), or the like.

According to some embodiments of the disclosure, the eMBB aims to provide a higher data rate than a data rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded in the 5G communication system. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services, such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra-low latency) and very high reliability (ultra-high reliability). For example, a service supporting the URLLC should satisfy air interface latency smaller than 0.5 milliseconds and at the same time, may have a packet error rate of $10^{-5}$ or less. Accordingly, for URLLC-supportive services, the 5G communication system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the disclosure is applied are not limited thereto.

In addition, although embodiments of the disclosure are described by using the LTE, LTE-A, LTE Pro, or 5G (or NR) system, the embodiments of the disclosure may be applied to other communication systems having a similar technical background or channel type. In addition, it will be understood by one of ordinary skill in the art that embodiments of the disclosure may be applied to other communication systems through some modifications without departing from the scope of the disclosure.

In addition, terms used below are defined based on functions in embodiments of the disclosure, and may have different meanings according to an intention of a user or operator, customs, or the like. Thus, the terms should be defined based on the description throughout the specification.

Hereinafter, embodiments of the disclosure will be described with reference to the accompanying drawings. Here, it should be noted that like reference numerals denote like elements in the accompanying drawings. It should also be noted that the accompanying drawings of the disclosure are provided to help understand the disclosure, and that the disclosure is not limited by forms or arrangements illustrated in the drawings of the disclosure. In addition, detailed descriptions about known functions and configurations that may blur the gist of the disclosure will be omitted. It should be noted that in the following description, only details required to understand operation according to various embodiments of the disclosure are described, and that description about other details will be omitted so that the gist of the disclosure will not be blurred. In addition, various embodiments of the disclosure are described by using the terms used in some communication standards (for example, 3GPP), but the embodiments of the disclosure are only examples for description. The various embodiments of the disclosure may be easily modified and applied to other communication systems.

In a 5G system, an access traffic steering, switching, splitting (ATSSS) functionality provides a method of reducing a transmission load by distributing data traffic between a data network (DN) and a UE by simultaneously using a 3GPP access and a non-3GPP access. A policy control function (PCF) may determine an ATSSS functionality-related policy including a data traffic steering mode, a steering functionality, and the like, and information about the determined ATSSS functionality-related policy may be included in a session management policy and transmitted to a session management function (SMF). While determining the ATSSS functionality-related policy, the PCF may refer to service requirements received from an application function (AF).

The SMF may determine ATSSS functionality-related information including the data traffic steering mode, the steering functionality, and address information required for traffic transmission and reception, and transmit the same to the UE and a user plane function (UPF). When determining the ATSSS functionality-related information, the SMF may refer to the session management policy received from the PCF. The address information required for traffic transmission and reception may include a UE Internet protocol (IP) address, a UPF IP address, and a UPF user datagram protocol (UDP) port number. Before transmitting the ATSSS functionality-related information to the UPF and the UE, the SMF may request the UPF for allocation of the UE IP address, the UPF IP address, and the UPF UDP port number, and add address information received from the UPF to the ATSSS functionality-related information.

In the 5G system so far, when allocating address information for one multi-access (MA) protocol data unit (PDU) session, it has been preferred to allocate one UPF UDP port for one UE IP address, one UPF IP address, and one access network (for example, one UDP port for a 3GPP access network and one UDP port for a non-3GPP access network).

In addition, in the 5G system, one PDU session may manage quality of service (QoS) of a session in one or more QoS flow units, according to a QoS profile required to provide a service. For example, when one PDU session is established for an Internet data network connection with a UE, a QoS profile (QoS profile A) required when the UE uses a real-time media streaming service (service A) and a QoS profile (QoS profile B) required when the UE uses a social network service (service B) may be different from each other. In this case, data traffic to which the QoS profile A is applied may be classified and managed as a QoS flow A, and data traffic to which the QoS profile B is applied may be classified and managed as a QoS flow B.

For the MA PDU session that is a session using an ATSSS functionality, there may be one or more data traffic transmission paths between the UE and the UPF, and one QoS flow may be transmitted and received through respective transmission paths. For a data traffic steering method and QoS management of the MA PDU session, performance may be measured for each traffic transmission path between the UE and the UPF. Here, a separate protocol higher than a UDP/IP protocol may be used between the UE and the UPF, and in the current 5G system, a performance measurement function (PMF) protocol is defined.

The data traffic transmission path between the UE and the UPF may be divided into the 3GPP access network and the non-3GPP access network, performance regarding a data traffic flow in the UE and the UPF may be measured for each access network, and information related to performance measurement may be included in a PMF message to be exchanged between the UE and the UPF.

Here, when one UDP port is allocated for each access network, a value of performance measurement regarding the data traffic flow for each access network is used as a measurement value regarding one representative QoS flow from among QoS flows being transmitted through each access network. Because required QoS characteristics, such as a maximum allowable delay time (or packet delay budget), a maximum allowable error rate (or packet error rate), a maximum allowable loss rate (or packet loss rate), a maximum allowable jitter, and a guaranteed bit rate, are different for each QoS flow, accuracy of the performance measurement may deteriorate when a performance measurement value regarding a traffic flow corresponding to an access network is used as a measurement value for one of a plurality of QoS flows transmitted through the access network as described above.

The disclosure provides a method and an apparatus for measuring a data traffic transmission performance by using a limited number of UDP ports of a core network, when a UE uses a service using a 5G core network and a MA PDU session in a wireless communication system.

According to an embodiment of the disclosure, a UPF notifies an SMF of the number of available UDP ports, and the SMF may determine the number of available representative values by comparing the number of available UDP ports received from the UPF with the number of QoS flows configuring the MA PDU session. When the number of QoS flows is greater than the number of available representative values, the SMF may classify the QoS flows into the number of groups equal to the number of available representative values, and determine a QoS flow representing the classified groups. The SMF may use service and/or application-related information provided by a PCF and/or a network state and/or performance-related analysis information provided by a network data analytic function (NWDAF). The SMF may notify the UE and UPF of ATSSS functionality-related information including information related to the classified groups and UDP port information regarding each representative QoS flow. The UE and the UPF may exchange performance measurement-related information with each other through a UDP port received from the SMF.

FIG. 1 is a diagram of a structure of a 5G system according to an embodiment of the disclosure.

Referring to FIG. 1, a 5G system architecture may include various components (i.e., network functions NFs). FIG. 1 illustrates some of the various components, i.e., an authentication server function (AUSF) entity 160, a (core) access and mobility management function (AMF) 120, a session management function (SMF) 130, a policy control function (PCF) 140, an application function (AF) 150, a unified data management (UDM) 170, a data network (DN) 180, a user plane function (UPF) 110, a (radio) access network, ((R)AN) 20, and a terminal, i.e., a UE 10. In addition, FIG. 1 illustrates a network slice selection function (NS SF) 190, a network slice specific authentication and authorization function (NSSAAF) 195, and a network slice admission control function (NSACF) 196.

Entities shown in FIG. 1 may each be embodied as one server or entity, or may each be embodied as a network slice instance as described above. When the entities are embodied as network slice instances, two or more same or different network slice instances may be realized in one server or entity, or one network slice instance may be realized in two or more servers or entities.

The NFs described above may support following functions.

The AUSF 160 may process and store data for UE authentication.

The AMF 120 may provide a function for access and mobility management in units of UEs, and one UE may be basically connected to one AMF. More specifically, the AMF 120 may support functions, such as signaling between a core network (CN) nodes for mobility between 3GPP access networks, termination of an RAN control plane (CP) interface (i.e., N2 interface), termination (N1) of non-access stratum (NAS) signaling, NAS signaling security (NAS ciphering and integrity protection), access stratum (AS) security control, registration management (registration area management), connection management, idle mode UE reachability (including controlling and performing of paging retransmission), mobility management control (subscription and policy), intra-system mobility and inter-system mobility support, network slicing support, SMF selection, lawful intercept (regarding an interface to an AMF event and lawful intercept (LI) system), transmission of a session management (SM) message between UE and SMF, transparent proxy for SM message routing, access authentication, access authorization including roaming authority check, transmission of a short message service (SMS) message between UE and a short message service function (SMSF), a security anchor function (SAF), and/or security context management (SCM). Some or all functions of the AMF 120 may be supported in a single AMF instance operating as one AMF.

The DN 180 may denote, for example, an operator service, an Internet access, or a third-party service. The DN 180 may transmit a downlink PDU to the UPF 110, or receive, through the UPF 110, a PDU transmitted from the UE 10.

The PCF 140 may receive information about a packet flow from an application server, and provide a function of determining a policy, such as mobility management, session management, or the like. More specifically, the PCF 140 may support functions, such as unified policy framework support for controlling a network operation, policy rule provision for a control plane function(s) (for example, AMF, SMF, and the like) to execute a policy rule, front end (FE) realization for accessing related subscription information to determine a policy in a user data repository (UDR).

The SMF 130 may provide a session management function, and when the UE 10 includes a plurality of sessions, the sessions may be managed by different SMFs 130. More specifically, the SMF 130 may support functions, such as session management (for example, session establishment, modification, and release including tunnel maintenance between UPF and an access network (AN) node), UE IP address allocation and management (selectively including authentication), selection and control of UPF, traffic steering configuration for routing traffic from UPF to a suitable destination, termination of an interface towards PCF, partial execution of control of policy and QoS, lawful intercept (regarding an interface to an SM event and LI system), termination of an SM part of an NAS message, downlink data notification, AN-specific SM information initiator (transmitted to AN through N2 via AMF), session and service continuity (SSC) mode determination of session, and roaming function. As described above, some or all functions of the SMF 130 may be supported in a single SMF instance operating as one SMF.

The UDM 170 may store subscription data, policy data, and the like of a user. The UDM 170 may include two portions, i.e., an application FE (not shown) and a UDR (not shown).

The application FE may include a UDM-FE for performing processes of location management, subscription management, and credential, and a PCF-FE for performing policy control. The UDM 170 may store data required for functions provided by the UDM-FE, and a policy profile required by the PCF. Data stored in the UDR may include the policy data and the user subscription data including a subscription identifier, security credential, access and mobility-related subscription data, and session-related subscription data. The UDM-FE may access subscription information stored in the UDR and support functions, such as authentication credential processing, user identification handling, access authentication, registration/mobility management, subscription management, and SMS management.

The UPF 110 may transmit the downlink PDU received from the DN 180 to the UE 10 through the (R)AN 20, and transmit an uplink PDU received from the UE 10 to the DN 180 through the (R)AN 20. More specifically, the UPF 110 may support functions, such as an anchor point for intra/inter radio access technology (RAT) mobility, an external PDU session point for interconnection to the DN 180, packing routing and forwarding, a user plane portion of packet inspection and policy rule execution, lawful intercept, traffic usage reporting, an uplink classifier for supporting routing of a traffic flow to the DN 180, a branching point for supporting a multi-homed PDU session, QoS handling for a user plane (for example, packet filtering, gating, and uplink/downlink rate execution), uplink traffic verification (service data flow (SDF) mapping between SDF and a QoS flow), transport level packet marking in uplink and downlink, downlink packet buffering, and downlink data notification triggering. Some or all functions of the UPF 110 may be supported in a single UPF instance operating as one UPF.

The AF 150 may interwork with the 3GPP core network to provide a service (for example, support functions, such as an application effect in traffic routing, an access to network capability exposure, and interworking with a policy framework for policy control).

The (R)AN 20 may collectively refer to a new RAN supporting both evolved E-UTRA that is an evolved version of a $4^{th}$ Generation (4G) radio access technology and a new radio access technology (NR) (for example, gNB).

The gNB may support functions for radio resource management (i.e., radio bearer control, radio admission control, connection mobility control, and dynamic allocation of resources to UE in uplink/downlink (i.e., scheduling)), and functions, such as IP header compression, user data stream encryption and integrity protection, selection of the AMF 120 during attachment of the UE 10 when routing to the AMF 120 is not determined based on information provided to the UE 10, user plane data routing to the UPF(s) 110, control plane information routing to the AMF 120, connection setup and release, scheduling and transmission of a paging message (occurred from the AMF 120), scheduling and transmission of system broadcast information (occurred from the AMF 120 or operating and maintenance (O&M)), measurement and measurement reporting configuration for mobility and scheduling, transport level packet marking in uplink, session management, network slicing support, QoS flow management and mapping to a data radio bearer, support of the UE 10 in an inactive mode, distribution of an NAS message, NAS node selection, radio access network sharing, dual connectivity, and tight interworking between NR and E-UTRA.

The UE 10 may denote a user device. The user device may also be referred to by a term, such as a terminal, a mobile equipment (ME), or a mobile station (MS). In addition, the user device may be a portable device, such as a laptop computer, a mobile phone, a personal digital assistant (PDA), a smartphone, or a multimedia device, or may be an unportable device, such as a personal computer (PC) or a vehicle-mounted device. Hereinafter, the user device may be referred to as a UE or a terminal.

Referring to FIG. 1, a network exposure function (NEF) and an NF repository function (NRF) are not illustrated for clarity of description, but all NFs shown in FIG. 5 described below may interwork with the NEF and NRF when necessary.

The NRF will now be described. The NRF (not shown in FIG. 1) may support a service discovery function. When a second NF discovery request is received from a first NF instance, information about a second NF instance discovered after a second NF discovery operation is performed may be provided to the first NF instance. In addition, available NF instances and a service supported by the available NF instances may be maintained.

FIG. 1 illustrates a reference model for a case where a UE uses one PDU session to access one DN for convenience of description, but the disclosure is not limited thereto.

The UE 10 may simultaneously access two (i.e., local and central) DNs by using multiple PDU sessions. At this time, two SMFs may be selected for different PDU sessions. However, each SMF may have capability for controlling both local UPF and central UPF within a PDU session.

In addition, the UE 10 may simultaneously access two (i.e., local and central) DNs provided within a single PDU session.

In a 3GPP system, a conceptual link connecting NFs in a 5G system is defined as a reference point. Hereinafter, reference points included in a 5G system architecture, which are shown in FIG. 1, are described.

N1: Reference point between UE and AMF
N2: Reference point between (R)AN and AMF
N3: Reference point between (R)AN and UPF
N4: Reference point between SMF and UPF N5: Reference point between PCF and AF
N6: Reference point between UPF and DN
N7: Reference point between SMF and PCF
N8: Reference point between UDM and AMF
N9: Reference point between two core UPFs
N10: Reference point between UDM and SMF
N11: Reference point between AMF and SMF
N12: Reference point between AMF and AUSF
N13: Reference point between UDM and AUSF
N14: Reference point between two AMFs
N15: Reference point between PCF and AMF in case of non-roaming scenario, and reference point between PCF and AMF in visited network in case of roaming scenario In the description below, a terminal may denote a UE, and the terms UE and terminal may be interchangeably used. In this case, the terminal may be understood to be the UE unless the terminal is specially additionally defined.

A terminal establishes a session by accessing a DN (for example, a network providing an Internet service) through a 5G system, and may distinguish DNs by using identifiers called data network names (DNNs). The DNN may be used to determine an NF related to a user plane, an interface between NFs, and an operator policy, while the terminal connects a network system to the session. For example, the DNN may be used to select an SMF and UPF(s) for a PDU session, and select an interface(s) (for example, an N6 interface) between a DN and a UPF for the PDU session. In addition, the DNN may be used to determine a policy of a mobile network operator, which is to be applied to the PDU session.

An ATSSS functionality is a function of transmitting data traffic through one or more accesses by using both a 3GPP access and a non-3GPP access described above between a terminal and a 5G core network. As a representative example, when the 5G core network determines that a user plane resource between the terminal and a DN is not sufficient or that network resource management capacity is loaded, the data traffic is not transmitted only through one access from among a 5G access or a Wi-Fi access, but data is distributed and transmitted by activating both the 5G access and the Wi-Fi access, according to the ATSSS functionality.

Figure 2:
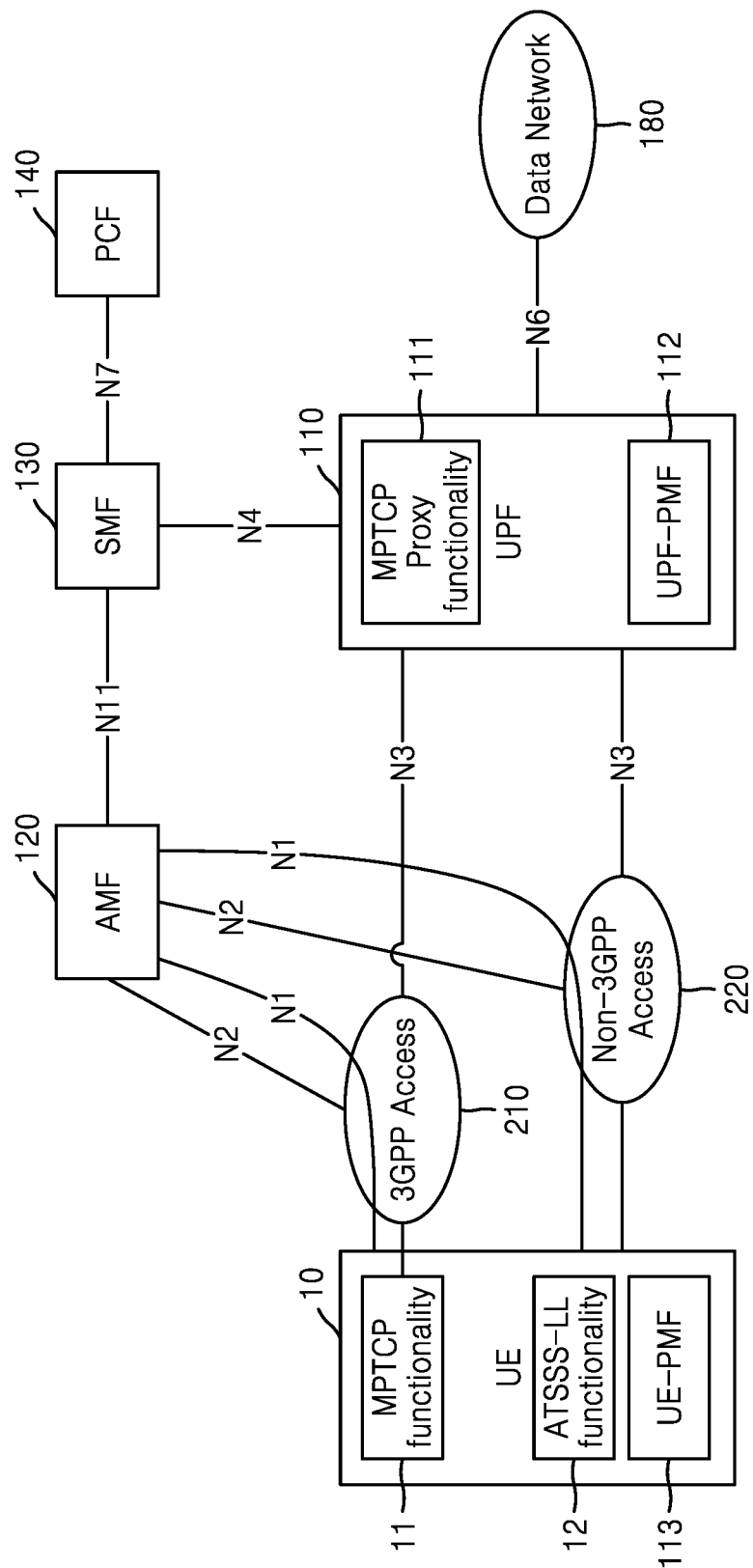
FIG. 2 is a diagram of a structure of a 5G system for supporting an access traffic steering, switching, splitting (ATSSS) functionality according to an embodiment of the disclosure.

FIG. 2 is a diagram of a structure for supporting an ATSSS functionality in a 3GPP 5G system according to an embodiment of the disclosure.

Referring to FIG. 2, the UE 10 may access a mobile communication network, for example, a 3GPP access 210, and a network that is not a mobile communication network, for example, a non-3GPP access 220. The ATSSS functionality includes a steering functionality and a steering mode.

The steering functionality determines a transport protocol between a UPF of a transmitting apparatus and a UPF of a receiving apparatus. The steering functionality is determined depending on which transport layer steering, switching, and splitting of traffic are determined, corresponds to "multipath transmission control protocol (MPTCP) functionality" when a MPTCP (IETF RFC 8684) protocol located at a higher layer than an IP layer is used, and corresponds to "ATSSS-lower layer (LL) functionality" when the steering, switching, and splitting of the traffic are determined at a lower layer than the IP layer. The UE 10 may include an MPTCP functionality 11 and an ATSSS-LL functionality 12.

The UE 10 and a network supporting the MPTCP functionality 11 may communicate with an MPTCP proxy functionality 111 separately configured in the UPF 110. The MPTCP functionality 11 may control only TCP traffic supporting only an MPTCP. When the ATSSS-LL functionality 12 is supported, a separate proxy component is not included in the UPF 110, and all types of TCP traffic may be controlled.

The steering mode defines a method of steering, switching, and splitting data traffic.

In addition, the UPF 110, the SMF 130, and the PCF 140, according to an embodiment of the disclosure, may perform separate control operations for accessing the UE 10. The control operation will be described with reference to the drawings below.

As shown in FIG. 2, the UPF 110 according to an embodiment of the disclosure may include the MPTCP proxy functionality 111 therein.

A PMF is a function of measuring a network environment between the UE 10 and the UPF 110, and may measure a round trip time (RTT) required for uplink and downlink, and whether the 3GPP access 210 and the non-3GPP access 220 are currently activated. The steering functionality and steering mode supportable by a core network may be determined based on information provided by the PMF, and the steering functionality and steering mode may have an overall effect on determining parameters for N3 and N4 connection. The PMF may be included in each of the UPF 110 and the UE 10. The PMF included in the UPF 110 may be referred to as a UPF-PMF 112, and the PMF included in the UE 10 may be referred to as a UE-PMF 113.

By using the ATSSS functionality described in FIG. 2, traffic transmission through a multipath is possible between the UE 10 and the PDU (or packet data unit) session anchor UPF 110.

Figure 3A:
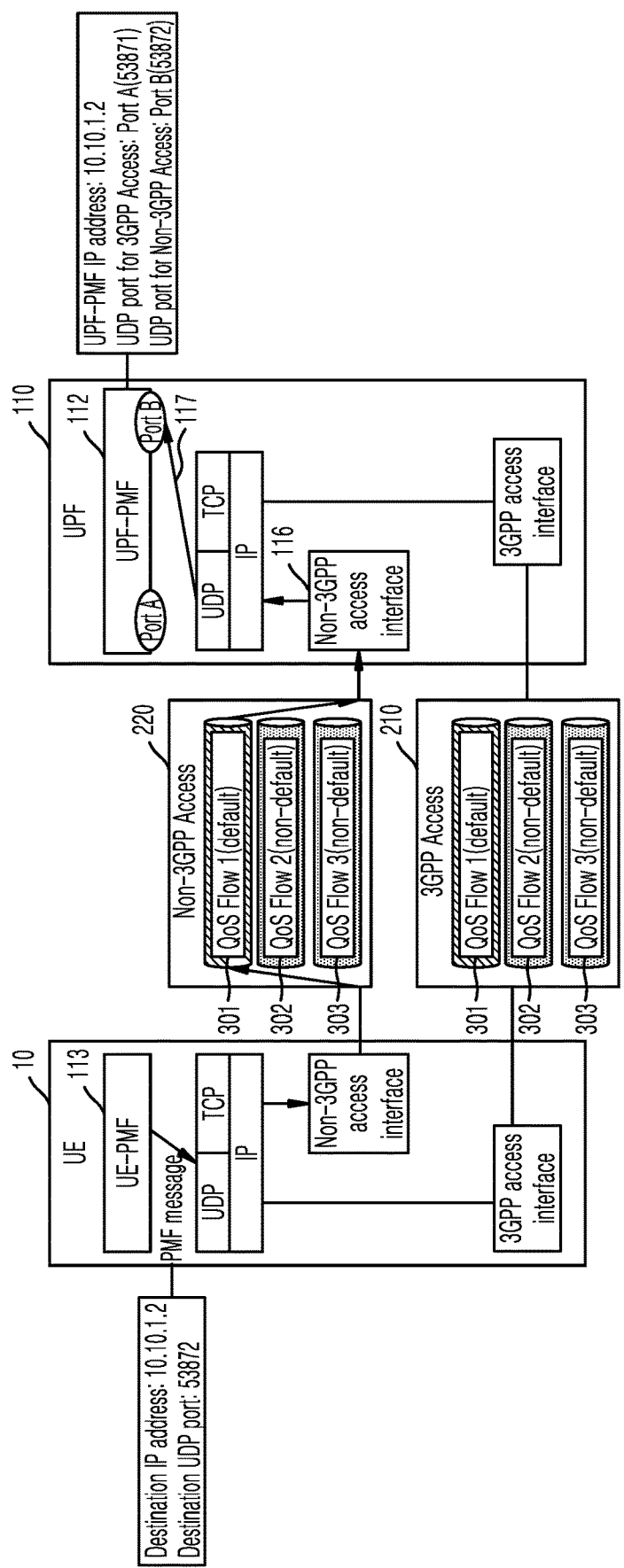
FIG. 3A is a diagram illustrating a user datagram protocol (UDP) port allocation method for measuring a data traffic performance, and a procedure related thereto, when a user plane function (UPF)-performance measurement function (PMF) allocates one UDP port per access network type according to an embodiment of the disclosure.
Figure 3B:
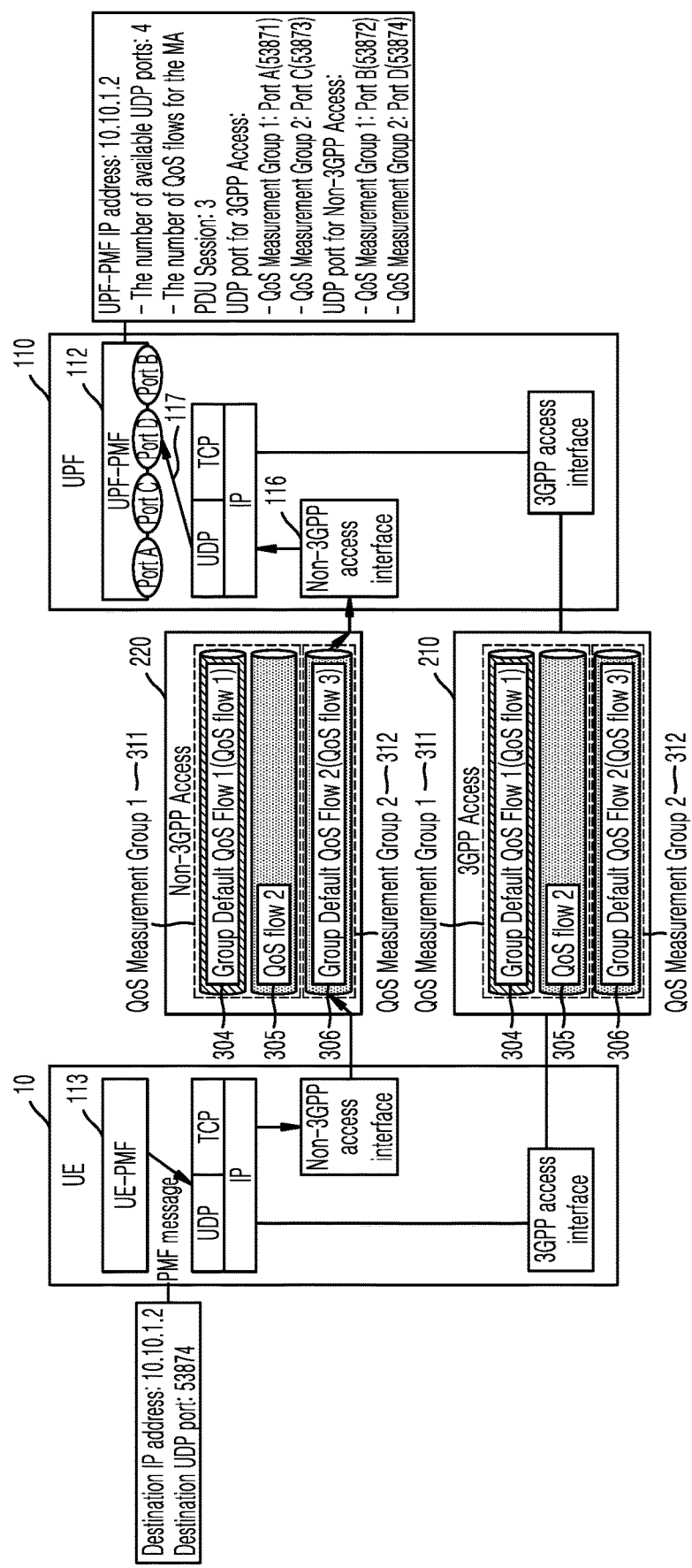
FIG. 3B is a diagram illustrating a UDP port allocation method for measuring a data traffic performance, and a procedure related thereto, when a UPF-PMF allocates one UDP port per quality of service (QoS) measurement group according to an embodiment of the disclosure.

FIGS. 3A and 3B are diagrams illustrating a UDP port allocation method for measuring a data traffic performance, and a procedure related thereto, according to various embodiments of the disclosure.

FIGS. 3A and 3B illustrate a method and a procedure by which the UE-PMF 113 transmits a PMF message to the UPF-PMF 112, in an MA PDU session including a QoS flow 1, a QoS flow 2, and a QoS flow 3.

FIG. 3A illustrates a case where the UPF-PMF 112 allocates one UDP port per access network type, and FIG. 3B illustrates a case where the UPF-PMF 112 allocates one UDP port per QoS measurement group.

Referring to FIG. 3A, the UPF-PMF 112 may allocate a UDP port for a 3GPP access network to a port A, and a UDP port for a non-3GPP access network to a port B. Information about the UDP port may be transmitted from the UPF 110 to an SMF, as described above.

When determining ATSSS functionality-related information, the SMF may determine a QoS flow representing data traffic performance measurement of each access network (access performance measurement).

A PCF may indicate that a specific QoS profile is a default QoS profile when transmitting a session management policy to the SMF. The SMF may determine a QoS flow mapped to the indicated default QoS profile as a default QoS flow. (A method and procedure of mapping a QoS profile and a QoS flow will be described below with reference to FIG. 5.) In addition, the SMF may determine the default QoS flow as a representative QoS flow of the access performance measurement.

The SMF may transmit, to the UE 10, the information about the UDP port allocated for each access network, information about a QoS flow configuring a session, and information about the default QoS flow by adding the same to the ATSSS functionality-related information. The UE 10 may use the ATSSS functionality-related information when transmitting, to the UPF 110, a PMF message including access performance measurement information.

FIG. 3A illustrates an example in which the UE-PMF 113 transmits performance measurement information regarding the non-3GPP access 220 to the UPF-PMF 112. When transmitting the PMF message, the UE-PMF 113 may write a UDP port number for the non-3GPP access 220 received from the SMF, on a destination UDP port number of a header of a packet. The packet may be classified as a packet for a QoS flow 1 301 that is the default QoS flow, a QoS flow 2 302 that is the non-default QoS flow, a QoS flow 2 303 that is the non-default QoS flow, and transmitted, in operation 117, to a port B that is a UDP port for the non-3GPP access of the UPF-PMF 112, through a non-3GPP access interface 116 of the UPF 110 through the non-3GPP access 220.

Referring to FIG. 3B, the UPF-PMF 112 may allocate the UDP port for the 3GPP access network to the port A and a port C, the UDP port for the non-3GPP access network to the port B and a port D, a UDP port for a QoS measurement group 1 to the port A and the port B respectively for the 3GPP access network and the non-3GPP access network, and a UDP port for a QoS measurement group 2 to the port C and the port D respectively for the 3GPP access network and the non-3GPP access network. The UPF 110 may transmit, to the SMF, information about the number of UDP ports currently available in the UPF 110, together with information about a UDP port allocated to the UPF-PMF 112.

The SMF may use the number of currently available UDP ports provided by the UPF 110, while determining the QoS flow that may represent the access performance measurement. In FIG. 3B, the number of QoS flows configuring a current MA PDU session is 3 and the number of UDP ports available to the UPF-PMF 112 for each access is 2 (a value obtained by dividing the number (4) of available UDP ports by the number (2) of access network types), 2, i.e., a smaller value thereamong, may be the number of representative QoS flows available for the access performance measurement.

Accordingly, the SMF may classify the 3 QoS flows configuring the current MA PDU session into 2 QoS measurement groups, and determine a group default QoS flow corresponding to a representative QoS flow of each group.

FIG. 3B illustrates a result of defining a QoS flow 1 304 and a QoS flow 2 305 as a QoS measurement group 1 311, a QoS flow 3 306 as a QoS measurement group 2 312, and the QoS flow 1 304 and QoS flow 3 306 as representative QoS flows of the QoS measurement group 1 311 and QoS measurement group 2 312.

The SMF may transmit, to the UE 10, information about a QoS measurement group, in addition to the information about the UDP port allocated for each access network, information about a QoS flow configuring a session, and information about the default QoS flow by adding the same to the ATSSS functionality-related information.

FIG. 3B illustrates a case in which the UE-PMF 113 transmits, to the UPF-PMF 112, performance measurement information regarding the non-3GPP access 220 of the QoS measurement group 2 312. When transmitting the PMF message, the UE-PMF 113 may write a UDP port number for the QoS measurement group 2 312 in the non-3GPP access 220 received from the SMF, on a destination UDP port number of a header of a packet. The packet may be classified as a packet for the QoS flow 3 306 that is a representative QoS flow of the QoS measurement group 2 312, and transmitted, in operation 117, to the port D that is a UDP port for the non-3GPP access of the QoS measurement group 2 312 of the UPF-PMF 112, through the non-3GPP access interface 116 of the UPF 110 through the non-3GPP access 220.

Figure 4:
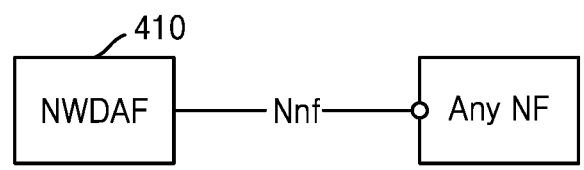
FIG. 4 is a diagram of a structure of a 5G system according to an embodiment of the disclosure.

FIG. 4 is a diagram of a structure of a 5G system according to an embodiment of the disclosure.

Referring to FIG. 4, it illustrates an NWDAF 410. The NWDAF 410 may collect data from any NF included in a core network. Here, the NWDAF 410 and a relative NF need to belong to a same public land mobile network (PLMN). An Nnrf reference point may be used between the NWDAF 410 and the any NF.

Figure 5:
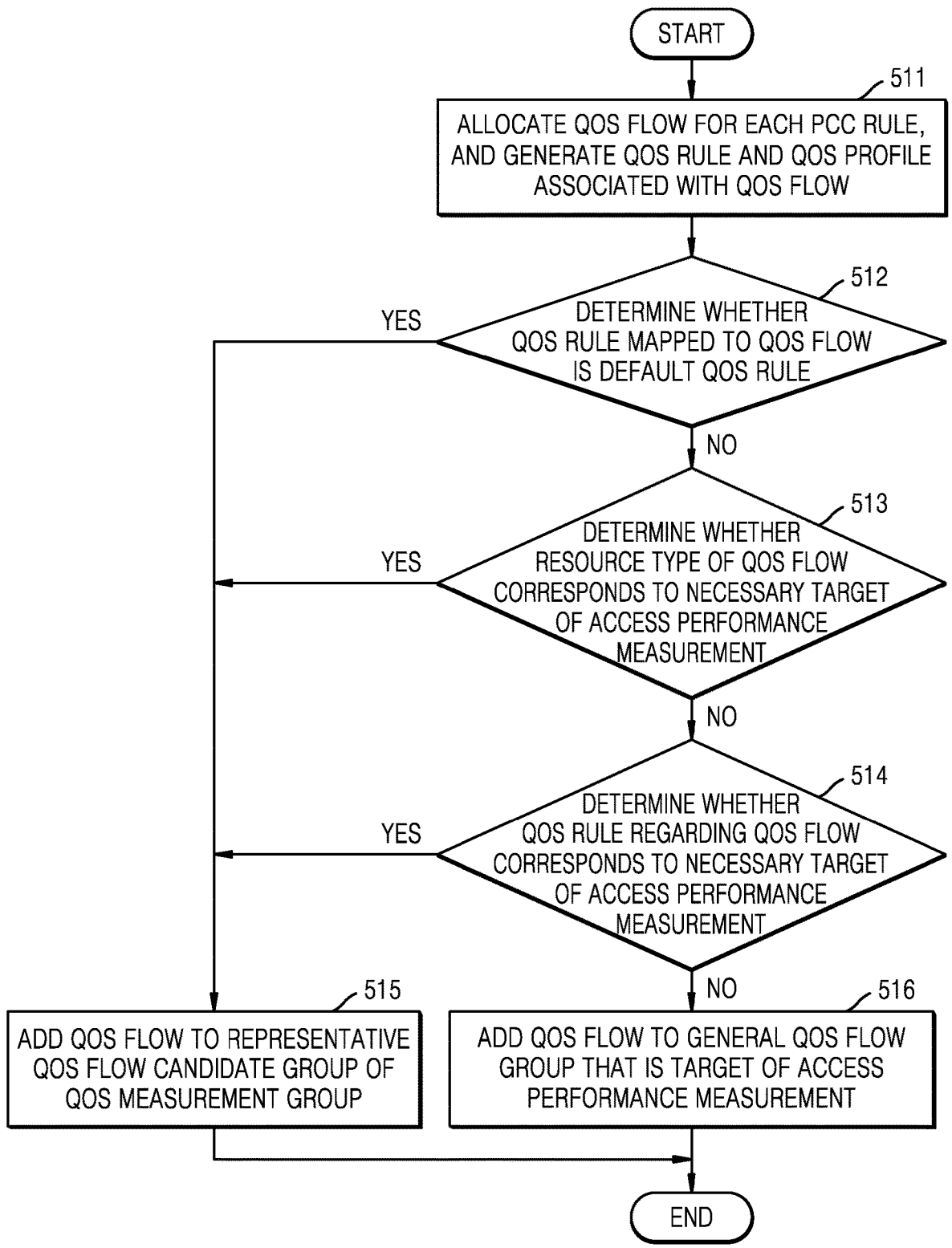
FIG. 5 is a flowchart of a method of determining a candidate of a representative value regarding a QoS flow group, and a procedure related thereto, according to an embodiment of the disclosure.

FIG. 5 is a flowchart of a method of determining a candidate of a representative value regarding a QoS flow group, and a procedure related thereto, according to an embodiment of the disclosure.

Referring to FIG. 5, the procedure may be performed by an SMF or another NF, and FIG. 5 will be described below on the basis that the procedure is performed by the SMF.

In operation 511, the SMF may allocate a QoS flow for each policy and charging control (PCC) rule, by using the PCC rule provided from a PCF and a binding parameter provided from the PCF or stored in the SMF. The binding parameter may include following parameters.

1. 5G QoS Identifier (5QI)
2. allocation and retention priority (ARP)
3. QoS notification control (QNC)
4. priority level
5. averaging window
6. maximum data burst volume One QoS flow may be characterized by one QoS profile, one or more QoS rules, one or more uplink packet detection rules (PDRs), and one or more downlink PDRs.

The SMF may define a QoS flow identity (QFI) to identify QoS flows.

The SMF may generate a QoS rule associated with the QoS flow, based on content of the PCC rule or an SMF internal configuration. The QoS rule may include a QFI, a packet filter set, and a precedence value. The QoS rule may be provided to a UE, and the UE may classify and mark uplink packets to be transmitted through the QoS flow, based on the QoS rule received from the SMF.

The SMF may determine a default QoS rule to be maintained for a lifetime of a corresponding PDU session.

The SMF may generate a QoS profile associated with the QoS flow, based on the content of the PCC rule or the SMF internal configuration. The QoS profile may be transmitted to an RAN, and the RAN may perform a network management operation for satisfying QoS parameters, such as packet delay budget (PDB), packet error rate (PER), and the like, included in the QoS profile.

In operations 512 through 514, the SMF may classify a candidate group for a representative QoS flow of a QoS measurement group regarding QoS flows configuring a current MA PDU session, and a general QoS flow group that may be a target of access performance measurement. An order of performing operations 512 through 514 may be changed, and some of operations 512 through 514 may be omitted. In addition, operations 512 through 514 may be performed in series as shown in FIG. 5, or may be performed in parallel unlike FIG. 5. This may be determined according to a policy of a service operator, a policy of a communication operator, or policy of a network operator.

In operation 512, the SMF may determine whether a QoS rule mapped to the QoS flow is a default QoS rule.

When the QoS rule mapped to the QoS flow is the default QoS rule ("Yes" in operation 512), the SMF may add the QoS flow to a representative QoS flow candidate group of a QoS measurement group, in operation 515.

When the QoS rule mapped to the QoS flow is not the default QoS rule ("No" in operation 512), the SMF may determine whether a resource type corresponding to the QoS flow corresponds to an essential target of the access performance measurement, according to information included in the PCC rule, in operation 513. Examples of the resource type include the followings.

1. guaranteed flow bit rate (GBR) QoS Flow: QoS flow that require specific bit rate value
2. delay critical GBR QoS Flow: GBR QoS flow with short maximum allowable delay
3. non-GBR QoS Flow: General QoS flow without required bit rate value When the resource type corresponding to the QoS flow is the essential target of the access performance measurement ("Yes" in operation 513), the SMF may add the QoS flow to the representative QoS flow candidate group of the QoS measurement group, in operation 515.

When the resource type corresponding to the QoS flow is not the essential target of the access performance measurement ("No" in operation 513), the SMF may determine whether the QoS rule mapped to the QoS flow corresponds to the essential target of the access performance measurement, according to the information included in the PCC rule, in operation 514.

When the QoS rule mapped to the QoS flow is the essential target of the access performance measurement ("Yes" in operation 514), the SMF may add the QoS flow to the representative QoS flow candidate group of the QoS measurement group, in operation 515.

When the QoS rule mapped to the QoS flow is not the essential target of the access performance measurement ("No" in operation 514), the SMF may add the QoS flow to a general QoS flow group that may be a target of the access performance measurement, in operation 516.

Figure 6:
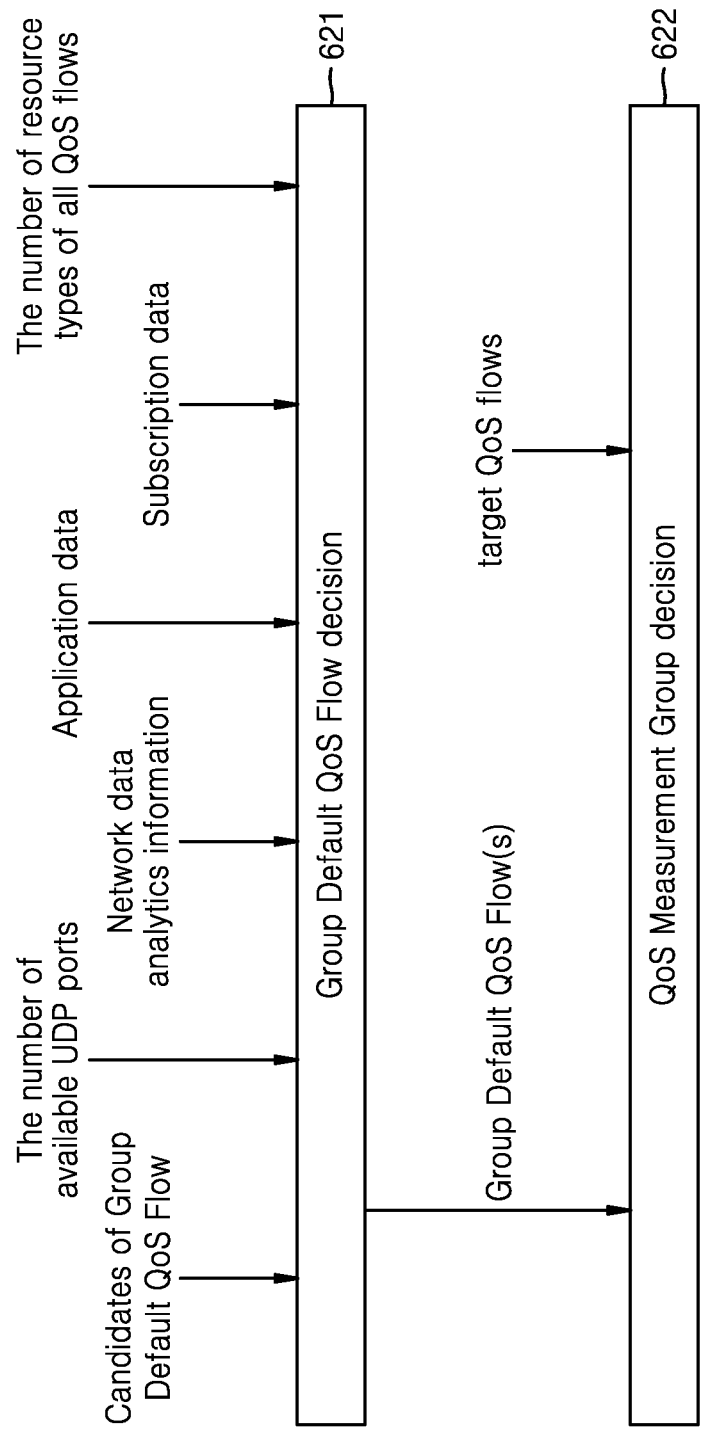
FIG. 6 is a diagram illustrating a QoS flow classification method and a procedure related thereto according to an embodiment of the disclosure.

FIG. 6 is a diagram illustrating a QoS flow classification method and a procedure related thereto, according to an embodiment of the disclosure.

Referring to FIG. 6, it may be performed by an SMF or another NF, and FIG. 6 will be described below on the basis that the procedure is performed by the SMF.

In operations 621 and 622, the SMF may classify QoS flows configuring a current MA PDU session and define a QoS measurement group, based on information received from a UPF, PCF, NWDAF, AF, and UDM and/or an SMF internal configuration.

An order of performing operations 621 and 622 may be changed, and some of operations 621 and 622 may be omitted. In addition, operations 621 and 622 may be performed in series as shown in FIG. 6, or may be performed in parallel unlike FIG. 6. This may be determined according to a policy of a service operator, a policy of a communication operator, or policy of a network operator.

In operation 621, the SMF may determine a group default QoS flow by using following information received from the UPF, PCF, NWDAF, AF, and UDM.

Candidates of group default QoS flow: candidate group for representative QoS flow of QoS measurement group (representative QoS flow candidate group of QoS measurement group described above with reference to operation 515 of FIG. 5)

Number of available UDP Ports: Number of UDP ports available for current MA PDU session in UPF Network data analytics information: data analytics information regarding a network state and performance Application data: Information about application used by current MA PDU session Subscription data: User subscription information Number of resource types of all QoS flows: number of resource types applied to all QoS flows configuring MA PDU session For example, the number resource types may be 1 when all QoS flows are non-GBR QoS flows.

In operation 622, the SMF may determine the QoS measurement group by comparing QoS characteristics between the group default QoS flow determined in operation 621 and all remaining QoS flows (target QoS flows). The SMF may consider similarities of the QoS flows while determining the QoS measurement group. For example, the SMF may determine that the QoS flows are similar when resource types of the QoS flows are the same or when packet delay budgets (PDBs), packet error rates (PERs), or packet loss rates (PLRs) associated with the QoS flows are similar.

FIG. 7A is a flow diagram of a session management method and a procedure related thereto according to an embodiment of the disclosure.

Referring to FIG. 7A, in operation 701 or 703, the SMF 130 and/or the AF 150 may request the PCF 140 to determine a PCC rule for a current MA PDU session.

In operation 701, the SMF 130 may provide, to the PCF 140, information about whether session management in QoS flow units is supported for the current MA PDU session. When the session management in QoS flow units is not supported, it may be considered that session management in access network type units is supported. For example, the SMF 130 may request the PCF 140 for the PCC rule for the MA PDU session, together with information indicating whether QoS measurement in QoS flow units is supported.

In operation 703, the AF 150 may provide information about whether QoS monitoring in QoS flow units is supported for a service or application used by the current MA PDU session. For example, the AF 150 may request the PCF 140 to determine the PCC rule for the MA PDU session, together with the information indicating whether QoS monitoring in QoS flow units is supported.

According to an embodiment of the disclosure, operations 701 and 703 may both be performed or only one of operations 701 and 703 may be performed. For example, the request for the PCC rule regarding the MA PDU session may be performed by at least one of the SMF 130 or the AF 150, according to operation 701.

In operation 705, the PCF 140 may request the NWDAF 410 for information required to determine similarities between a representative QoS flow and remaining QoS flows, while classifying QoS flows configuring the current MA PDU session. For example, the PCF 140 may request the NWDAF 410 for network data analytics information for QoS flow grouping.

In operation 707, the NWDAF 410 may collect, from the UE 10 and/or other NFs, network slice resource information associated with the current MA PDU session, NF node level information, and service experience-related information, and analyze the same. The NWDAF 410 may transmit, to the PCF 140, the information required to determine the similarities between the QoS flows configuring the current MA PDU session, from among the pieces of collected and analyzed information. For example, the NWDAF 410 may transmit the network data analytics information to the PCF 140.

In operation 709, the PCF 140 may determine the PCC rule, based on the pieces of information received in operations 701 through 705. For example, the PCF 140 may determine the PCC rule, based on at least one of the request for PCC rule for the MA PDU session and the information indicating whether the QoS measurement in QoS flow units is supported, which are received in operation 701, the request to determine the PCC rule for the MA PDU session and the information indicating whether the QoS monitoring in QoS flow units is supported, which are received in operation 703, or the network data analytics information for the QoS flow grouping, which is received in operation 707.

In operation 711, the PCF 140 may transmit information about the PCC rule to the SMF 130. For example, the PCF 140 may transmit the information about the PCF 140 together with the network data analytics information in QoS flow units for the MA PDU session and QoS monitoring request information in QoS flow units.

In operation 713, the SMF 130 may map a QoS flow in units for identifying a QoS characteristic, to a QoS rule included in the PCC rule received from the PCF 140.

In operation 715, the SMF 130 may determine a group default QoS flow candidate group.

FIG. 7B is a flow diagram of a session management method and a procedure related thereto, according to an embodiment of the disclosure.

Operations 717 through 739 described with reference to FIG. 7B may be associated with operations 701 through 715 described with reference to FIG. 7A.

In operation 717, the SMF 130 may request the UPF 110 for the number of UPF-PMF UDP ports available in the current MA PDU session, and receive, from the UPF 110, information about the number of available UPF-PMF UDP ports.

In operation 719, the SMF 130 may determine a QoS measurement group.

In operation 721, the SMF 130 may transmit information about the QoS measurement group to the UPF 110.

In operation 723, the UPF 110 may allocate a UPF-PMF IP address and UDP port for each QoS measurement group.

In operation 725, the UPF 110 may transmit, to the SMF 130, address information allocated for each QoS measurement group.

In operation 727, the SMF 130 may transmit, to the UE 10, ATSSS functionality-related information including the information about the UPF-PMF IP address allocated for each QoS measurement group. For example, the SMF 130 may transmit, to the UE 10, measurement assistance information including the information about the UPF-PMF IP address allocated for each QoS measurement group, together with ATSSS rules-related information.

In operation 729, the SMF 130 may transmit the ATSSS functionality-related information to the UPF 110. For example, the SMF 130 may transmit N4 rules-related information to the UPF 110.

In operation 731, the UE 10 and the UPF 110 may exchange a PMF message by using a UE IP address, and the UPF-PMF IP address and the number of UDP ports for each QoS measurement group, which are defined in operation 723.

In operation 733, the UPF 110 may transmit, to the SMF 130, access performance measurement information received from the UE 10 through the PMF message. Here, the access performance measurement information may include information obtained by measuring a performance of a specific access network regarding a specific group default QoS flow.

In operation 735, the SMF 130 may calculate access performance measurement information for remaining QoS flows (hereinafter, target QoS flows) in the QoS measurement group to which the group default QoS flow belongs, based on the information obtained by measuring the performance of the specific access network regarding the specific group default QoS flow, which is received in operation 733.

In operation 737, the SMF 130 may transmit, to the PCF 140, the access performance measurement information received and/or calculated in operation 733 and/or operation 735. For example, the SMF 130 may transmit the access performance measurement information for the target QoS flows.

In operation 739, the PCF 140 may transmit, to the AF 150, QoS monitoring information related to the information received in operation 737. For example, the PCF 140 may transmit, to the AF 150, QoS monitoring information regarding the target QoS flows.

Figure 8:
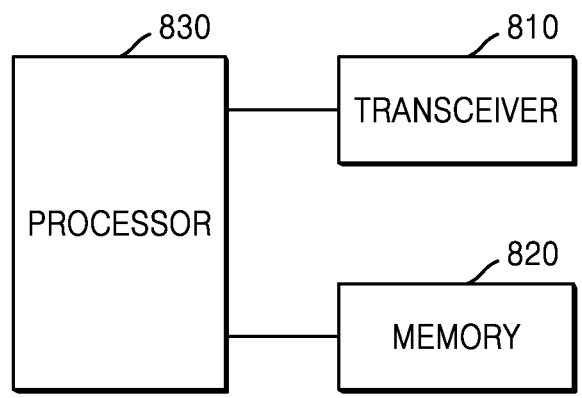
FIG. 8 is a block diagram illustrating a configuration of a user equipment (UE) according to an embodiment of the disclosure.

FIG. 8 is a block diagram illustrating a configuration of a UE according to an embodiment of the disclosure.

Referring to FIG. 8, the UE according to an embodiment of the disclosure may include a transceiver 810, a memory 820, and a processor 830. The transceiver 810, the memory 820, and the processor 830 of the UE may operate according to a communication method of the UE described above. However, the components of the UE are not limited thereto. For example, the UE may include more or fewer components than those described above. In addition, the processor 830, the transceiver 810, and the memory 820 may be implemented in a form of one chip. In addition, the processor 830 may include one or more processors.

The transceiver 810 collectively refers to a receiver and a transmitter of the UE, and may transmit/receive a signal to/from a base station. The signal transmitted or received to or from the base station may include control information and data. In this regard, the transceiver 810 may include a radio frequency (RF) transmitter for up-converting and amplifying a frequency of a transmitted signal, and a RF receiver for amplifying low-noise and down-converting a frequency of a received signal. However, this is only an example of the transceiver 810 and components of the transceiver 810 are not limited to the RF transmitter and the RF receiver.

In addition, the transceiver 810 may receive and output, to the processor 830, a signal through a wireless channel, and transmit a signal output from the processor 830 through the wireless channel.

The memory 820 may store a program and data required for operations of the UE. In addition, the memory 820 may store control information or data included in a signal obtained by the UE. The memory 820 may be a storage medium, such as a read-only memory (ROM), a random access memory (RAM), a hard disk, a compact disc read only memory (CD-ROM), and a digital versatile disc (DVD), or a combination of storage media.

The processor 830 may control a series of processes such that the UE operates according to an embodiment of the disclosure described above. For example, the processor 830 may receive a control signal and a data signal via the transceiver 810 and process the received control signal and data signal. In addition, the processor 830 may transmit the processed control signal and data signal via the transceiver 810.

Figure 9:
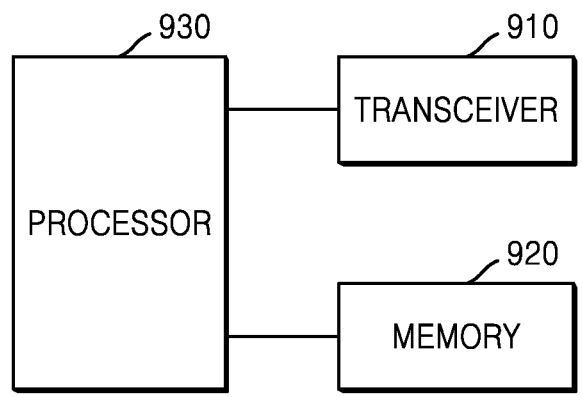
FIG. 9 is a block diagram of a configuration of a network entity according to an embodiment of the disclosure.

FIG. 9 is a block diagram of a configuration of a network entity according to an embodiment of the disclosure.

Referring to FIG. 9, the network entity according to an embodiment of the disclosure may include a transceiver 910, a memory 920, and a processor 930. The processor 930, the transceiver 910, and the memory 920 of the network entity may operate according to a communication method of the network entity described above. However, the components of the network entity are not limited thereto. For example, the network entity may include more or fewer components than those described above. In addition, the processor 930, the transceiver 910, and the memory 920 may be implemented in a form of one chip. In addition, the processor 930 may include one or more processors.

According to an embodiment of the disclosure, the network entity may include the UPF 110, the SMF 130, the PCF 140, the NWDAF 410, and the AF 150. However, this is only an example and the network entity may include various entities.

The transceiver 910 collectively refers to a receiver and a transmitter of the network entity, and may transmit/receive a signal to/from a base station. The signal transmitted or received to or from the base station may include control information and data. In this regard, the transceiver 910 may include an RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

In addition, the transceiver 910 may receive and output, to the processor 930, a signal through a wireless channel, and transmit a signal output from the processor 930 through the wireless channel.

The memory 920 may store a program and data required for operations of the network entity. In addition, the memory 920 may store control information or data included in a signal obtained by the network entity. The memory 920 may be a storage medium, such as a ROM, a RAM, a hard disk, a CD-ROM, and a DVD, or a combination of storage media.

The processor 930 may control a series of processes such that the network entity operates as according to an embodiment of the disclosure described above. For example, the processor 930 may receive a control signal and a data signal via the transceiver 910 and process the received control signal and data signal. In addition, the processor 930 may transmit the processed control signal and data signal via the transceiver 910.

According to an embodiment of the disclosure, a method performed by a session management function (SMF), includes receiving, from a user plane function (UPF), information about a number of available user datagram protocol (UDP) ports, classifying, based on the number of available UDP ports, quality of service (QoS) flows regarding a multi-access (MA) protocol data unit (PDU) session into one or more QoS measurement groups, determining a representative QoS flow for each of the one or more QoS measurement groups, transmitting, to a user equipment (UE) and the UPF, access traffic steering, switching, splitting (ATSSS) function-related information including the information about the number of available UDP ports, information about the one or more QoS measurement groups, information about the representative QoS flow, and information about a UDP port allocated for each of the one or more QoS measurement groups, and receiving, from the UE, access performance measurement information regarding the representative QoS flow, the access performance measurement information being identified as the UE and the UPF exchange a performance measurement function (PMF) message, based on the ATSSS functionality-related information.

The method may further include determining, as the information about the UDP port allocated for each of the one or more QoS measurement groups, mapping information between available at least one UDP port and at least one QoS measurement group, based on the information about the number of available UDP ports received from the UPF.

The method may further include transmitting, to the UPF, the mapping information between the available at least one UDP port and the at least one QoS measurement group, as the information about the UDP port allocated for each of the one or more QoS measurement groups.

The method may further include receiving, from the UPF, the information about the UDP port allocated for each of the one or more QoS measurement groups. The classifying may include determining a number of representative QoS flows, based on a result of comparing a number of QoS flows included in the MA PDU session with the number of available UDP ports, and classifying the QoS flows into a number of QoS measurement groups equal to the number of representative QoS flows.

The determining of the number of representative QoS flows may include determining, as the number of representative QoS flows, a smaller value from among values obtained by dividing the number of QoS flows included in the MA PDU session and the number of available UDP ports by a number of access network types.

The determining of the representative QoS flows may include determining, as a representative QoS flow candidate group, at least one of one or more QoS flows included in the one or more QoS measurement groups.

The determining of the at least one of the one or more QoS flows as the representative QoS flow candidate group may include, when a QoS rule mapped to a QoS flow included in the one or more QoS measurement groups is a default QoS rule, adding the QoS flow to the representative QoS flow candidate group.

The determining of the at least one of the one or more QoS flows as the representative QoS flow candidate group may include, when a resource type corresponding to a QoS flow included in the one or more QoS measurement groups is an essential target of access performance measurement, adding the QoS flow to the representative QoS flow candidate group.

The determining of the at least one of the one or more QoS flows as the representative QoS flow candidate group may include, when a QoS rule mapped to a QoS flow included in the one or more QoS measurement groups is an essential target of access performance measurement, adding the QoS flow to the representative QoS flow candidate group.

The method may further include determining, as a target QoS flow that is a target of access performance measurement, remaining QoS flows obtained by excluding a QoS flow included in a representative QoS flow candidate group from one or more QoS flows included in the one or more QoS measurement groups.

The method may further include determining access performance information regarding the target QoS flow, based on the access performance measurement information received from the UE, and transmitting the determined access performance information to a policy control function (PCF).

The representative QoS flow may be used to measure a data traffic performance of an access network.

According to another embodiment of the disclosure, a session management function (SMF) entity includes a transceiver, and at least one processor configured to receive, through the transceiver from a user plane function (UPF), information about a number of available user datagram protocol (UDP) ports, classify, based on the number of available UDP ports, quality of service (QoS) flows regarding a multi-access (MA) protocol data unit (PDU) session into one or more QoS measurement groups, determine a representative QoS flow for each of the one or more QoS measurement groups, receive, through the transceiver from the UPF, information about a UDP port allocated for each of the one or more QoS measurement groups, transmit, through the transceiver to a user equipment (UE) and the UPF, access traffic steering, switching, splitting (ATSSS) function-related information including the information about the number of available UDP ports, information about the one or more QoS measurement groups, information about the representative QoS flow, and information about the allocated UDP port, and receive, through the transceiver from the UE, access performance measurement information regarding the representative QoS flow, the access performance measurement information being identified as the UE and the UPF exchange a performance measurement function (PMF) message, based on the ATSSS functionality-related information.

The at least one processor may be further configured to determine a number of representative QoS flows, based on a result of comparing a number of QoS flows included in the MA PDU session with the number of available UDP ports, and classify the QoS flows into a number of QoS measurement groups equal to the number of representative QoS flows.

The at least one processor may be further configured to determine, as the number of representative QoS flows, a smaller value from among values obtained by dividing the number of QoS flows included in the MA PDU session and the number of available UDP ports by a number of access network types.

The at least one processor may be further configured to determine, as a representative QoS flow candidate group, at least one of one or more QoS flows included in the one or more QoS measurement groups.

The at least one processor may be further configured to, when a QoS rule mapped to a QoS flow included in the one or more QoS measurement groups is a default QoS rule, add the QoS flow to the representative QoS flow candidate group.

The at least one processor may be further configured to, when a resource type corresponding to a QoS flow included in the one or more QoS measurement groups is an essential target of access performance measurement, add the QoS flow to the representative QoS flow candidate group.

The at least one processor may be further configured to, when a QoS rule mapped to a QoS flow included in the one or more QoS measurement groups is an essential target of access performance measurement, add the QoS flow to the representative QoS flow candidate group.

The at least one processor may be further configured to determine, as a target QoS flow that is a target of access performance measurement, remaining QoS flows obtained by excluding a QoS flow included in a representative QoS flow candidate group from one or more QoS flows included in the one or more QoS measurement groups.

The at least one processor may be further configured to: determine access performance information regarding the target QoS flow, based on the access performance measurement information received from the UE, and transmit, through the transceiver to a policy control function (PFC), the determined access performance information.

The representative QoS flow may be used to measure a data traffic performance of an access network.

In accordance with an embodiment of the disclosure, a method performed by a session management function (SMF) entity in a wireless communication system is provided. The method may comprise transmitting, to a user plane function (UPF) entity, information indicating a list of quality of service (QoS) flows over which access performance measurements are to be performed, receiving, from the UPF entity, information indicating user datagram protocol (UDP) ports allocated for the QoS flows, and transmitting, to a user equipment (UE), information including the list of QoS flows and the UDP ports.

In an embodiment of the disclosure, the method may further comprise determining the list of one or more QoS flows.

In an embodiment of the disclosure, the method may further comprise receiving, from the UPF entity, performance measurement function (PMF) internet protocol (IP) address information associated with the QoS flows.

In an embodiment of the disclosure, wherein the access performance measurements are applied for a multi-access (MA) protocol data unit (PDU) session.

In an embodiment of the disclosure, wherein the QoS flows are associated with QoS flow identities (QFIs).

In an embodiment of the disclosure, wherein based on the QoS flows and the UDP ports, a performance measurement function (PMF) message is exchanged between the UE and the UDP.

In an embodiment of the disclosure, wherein in case that the PMF message is transmitted over a QoS flow from the UE to the UPF, a destination UDP port is set as a UDP port for the QoS flow.

In accordance with an embodiment of the disclosure, a session management function (SMF) entity in a wireless communication system is provided. The SMF may comprise a transceiver, and at least one processor coupled to the transceiver and configured to transmit, to a user plane function (UPF) entity via the transceiver, information indicating a list of quality of service (QoS) flows over which access performance measurements are to be performed, receive, from the UPF entity via the transceiver, information indicating user datagram protocol (UDP) ports allocated for the QoS flows, and transmit, to a user equipment (UE) via the transceiver, information including the list of QoS flows and the UDP ports.

In an embodiment of the disclosure, wherein the at least one processor is further configured to determine the list of one or more QoS flows.

In an embodiment of the disclosure, wherein the at least one processor is further configured to receive, from the UPF entity via the transceiver, performance measurement function (PMF) internet protocol (IP) address information associated with the QoS flows.

In an embodiment of the disclosure, wherein the access performance measurements are applied for a multi-access (MA) protocol data unit (PDU) session.

In an embodiment of the disclosure, wherein the QoS flows are associated with QoS flow identities (QFIs).

In an embodiment of the disclosure, wherein based on the QoS flows and the UDP ports, a performance measurement function (PMF) message is exchanged between the UE and the UDP.

In an embodiment of the disclosure, wherein in case that the PMF message is transmitted over a QoS flow from the UE to the UPF, a destination UDP port is set as a UDP port for the QoS flow.

In accordance with an embodiment of the disclosure, a method performed by a user plane function (UPF) entity in a wireless communication system is provided. The method may comprise receiving, from a session management function (SMF) entity, information indicating a list of quality of service (QoS) flows over which access performance measurements are to be performed, transmitting, to the SMF entity, information indicating user datagram protocol (UDP)

ports allocated for the QoS flows, and transmitting, to a user equipment (UE), a performance measurement function (PMF) message, based on the QoS flows and the UDP ports.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description of the disclosure.

The programs (e.g., software modules or software) may be stored in a random access memory (RAM), a non-volatile memory including a flash memory, a read-only memory (ROM), an electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network, such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to specific embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

According to an apparatus and method according to various embodiments of the disclosure, when a UE uses a service by using a 5G core network and an MA PDU session in a wireless communication system, QoS flows with similar QoS characteristics are classified based on information about the service and application used by the UE, a network state, and performance analysis information, thereby improving accuracy of measuring data traffic transmission performance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a session management function (SMF) entity, information including a list of quality of service (QOS) flows over which access performance measurements are to be performed, and user datagram protocol (UDP) ports allocated per QoS flow and per access for the list of QoS flows;
   identifying a destination UDP port for transmission of a performance measurement function (PMF) message, based on the received information,
   wherein in case of transmitting the PMF message over a QoS flow of an access, the destination UDP port is set as a UDP port for the QoS flow and the access in the received information; and
   transmitting, to a user plane function (UPF) entity, the PMF message, based on the destination UDP port.

2. The method of claim 1, wherein the UDP ports include a first UDP port allocated to a first QoS flow for $3^{rd}$ generation partnership project (3GPP) access, a second UDP port allocated to the first QoS flow for non-3GPP access, a third UDP port allocated to a second QoS flow for the 3GPP access, and a fourth UDP port allocated to the second QoS flow for the non-3GPP access.

3. The method of claim 1, wherein the received information further includes address information of a PMF in the UPF entity.

4. The method of claim 3, wherein the address information of the PMF includes an internet protocol (IP) address for the PMF.

5. The method of claim 1, wherein the access performance measurements are applied for a multi-access (MA) protocol data unit (PDU) session.

6. A method performed by a session management function (SMF) entity in a wireless communication system, the method comprising:
   transmitting, to a user plane function (UPF) entity, information indicating a list of quality of service (QOS) flows over which access performance measurements are to be performed;
   receiving, from the UPF entity, information indicating user datagram protocol (UDP) ports allocated per QoS flow and per access for the list of QoS flows; and
   transmitting, to a user equipment (UE), information including the list of QoS flows and the allocated UDP ports,
   wherein the information transmitted to the UE is associated with a destination UDP port for transmission of a performance measurement function (PMF) message, and
   wherein in case of transmitting the PMF message over a QoS flow of an access, the destination UDP port corresponds to a UDP port for the QoS flow and the access in the information transmitted to the UE.

7. The method of claim 6, wherein the UDP ports include a first UDP port allocated to a first QoS flow for $3^{rd}$ generation partnership project (3GPP) access, a second UDP port allocated to the first QoS flow for non-3GPP access, a third UDP port allocated to a second QoS flow for the 3GPP access, and a fourth UDP port allocated to the second QoS flow for the non-3GPP access.

8. The method of claim 6, wherein the information transmitted to the UE further includes address information of a PMF in the UPF entity.

9. The method of claim 8, wherein the address information of the PMF includes an internet protocol (IP) address for the PMF.

10. The method of claim 6, wherein the access performance measurements are applied for a multi-access (MA) protocol data unit (PDU) session.

11. A user equipment (UE) in a wireless communication system, the UE comprising:
- a transceiver; and
- at least one processor coupled with the transceiver and configured to:
- receive, from a session management function (SMF) entity, information including a list of quality of service (QOS) flows over which access performance measurements are to be performed, and user datagram protocol (UDP) ports allocated per QoS flow and per access for the list of QoS flows;
- identify a destination UDP port for transmission of a performance measurement function (PMF) message, based on the received information,
- wherein in case of transmitting the PMF message over a QoS flow of an access, the destination UDP port is set as a UDP port for the QoS flow and the access in the received information; and
- transmit, to a user plane function (UPF) entity, the PMF message, based on the destination UDP port.

12. A session management function (SMF) entity in a wireless communication system, the SMF entity comprising:
- a transceiver; and
- at least one processor coupled with the transceiver and configured to:
- transmit, to a user plane function (UPF) entity, information indicating a list of quality of service (QOS) flows over which access performance measurements are to be performed;
- receive, from the UPF entity, information indicating user datagram protocol (UDP) ports allocated per QoS flow and per access for the list of QoS flows; and
- transmit, to a user equipment (UE), information including the list of QoS flows and the allocated UDP ports,
- wherein the information transmitted to the UE is associated with a destination UDP port for transmission of a performance measurement function (PMF) message, and
- wherein in case of transmitting the PMF message over a QoS flow of an access, the destination UDP port corresponds to a UDP port for the QoS flow and the access in the information transmitted to the UE.

* * * * *